United States Patent
Fouse et al.

(10) Patent No.: US 7,204,440 B2
(45) Date of Patent: Apr. 17, 2007

(54) SLICING CONDIMENT GRINDER

(75) Inventors: Frederick Fouse, Manhattan Beach, CA (US); James J. Nemeth, Costa Mesa, CA (US)

(73) Assignee: William Bounds, Ltd., Torrance, CA (US)

( * ) Notice: Subject to any disclaimer, the term of this patent is extended or adjusted under 35 U.S.C. 154(b) by 197 days.

(21) Appl. No.: 10/965,654

(22) Filed: Oct. 13, 2004

(65) Prior Publication Data

US 2006/0076442 A1     Apr. 13, 2006

(51) Int. Cl.
 *A47J 42/34*     (2006.01)
(52) U.S. Cl. .................. 241/95; 241/168; 241/169.1
(58) Field of Classification Search ............. 241/168, 241/95, DIG. 17, 169.1
See application file for complete search history.

(56) References Cited

U.S. PATENT DOCUMENTS

| 473,051 | A |   | 4/1892 | Abbott |
| 824,058 | A | * | 6/1906 | Bain ........................ 222/241 |
| 899,716 | A | * | 9/1908 | Dinsmore ................. 241/89.4 |
| 1,077,482 | A |   | 11/1913 | Lippincott |
| 1,182,541 | A |   | 5/1916 | Egge |
| 2,539,734 | A | * | 1/1951 | Echols, Sr. et al. ........ 241/88.1 |
| 3,489,357 | A | * | 1/1970 | Takahashi ................... 241/95 |
| 3,552,460 | A |   | 1/1971 | Cooney |
| 4,082,230 | A |   | 4/1978 | Bounds |
| 4,311,283 | A |   | 1/1982 | Bounds |
| 5,651,506 | A |   | 7/1997 | Hockey |

* cited by examiner

*Primary Examiner*—Mark Rosenbaum
(74) *Attorney, Agent, or Firm*—Edward A. Sokolski

(57) ABSTRACT

A condiment grinder has a main container with a top rotatable drive portion having Drive arms are rotatably mounted in the bottom portion of the container in a compartment formed between a flat top plate and a flat bottom plate having cutting blades formed therein. The top plate is resiliently urged towards the flat bottom plate by a spring mounted in the container between the drive portion and the top plate. Condiment to be ground is placed in the compartment. The top drive portion is connected to the drive arms such that when the top drive portion is rotated, the drive arms drive the condiment against the cutting blades to effect the grinding action, the ground condiment being passed out from the container.

12 Claims, 2 Drawing Sheets

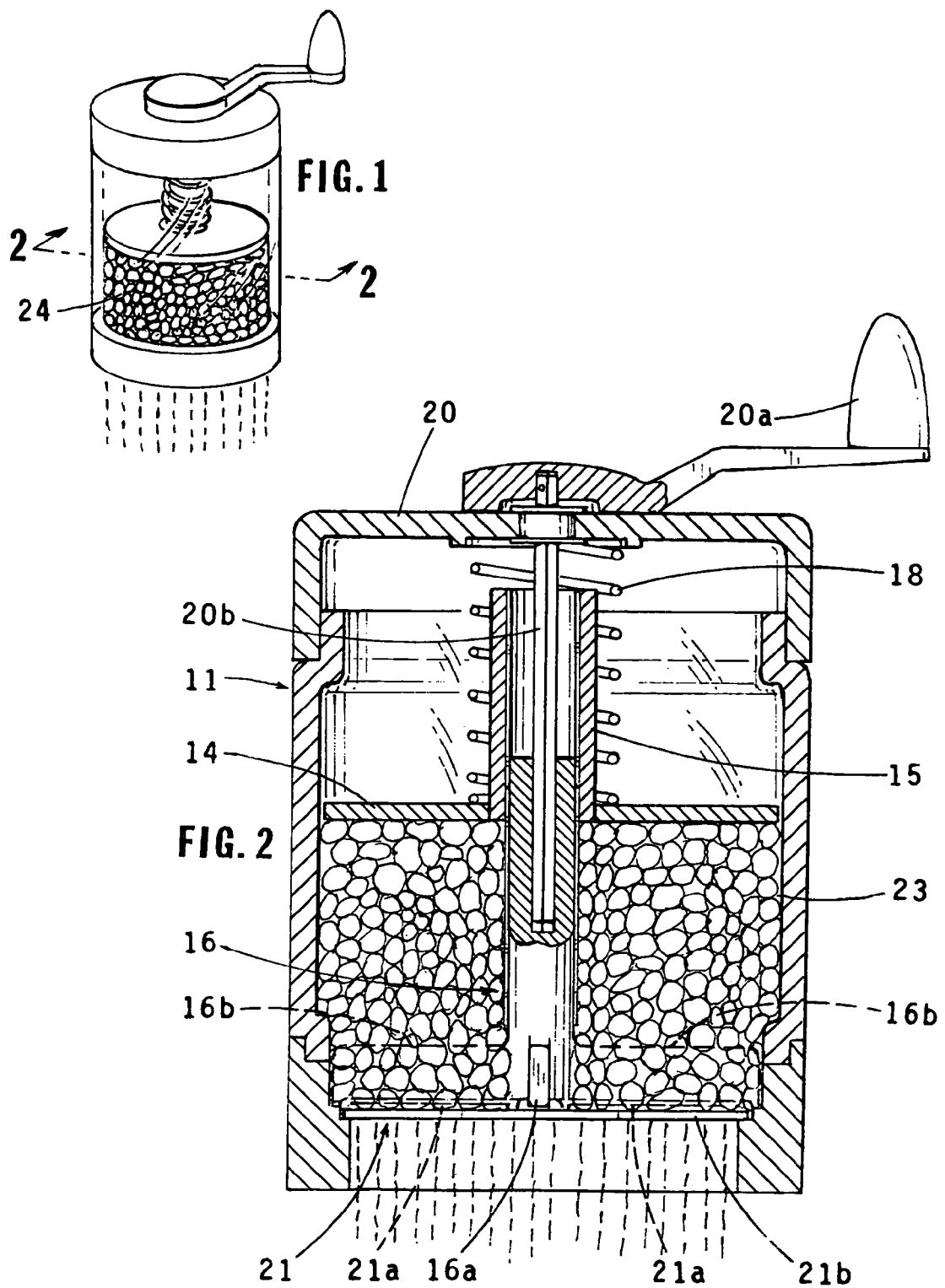

SLICING CONDIMENT GRINDER

BACKGROUND OF THE INVENTION

1. Field of the Invention

This invention relates to a condiment grinder which slices condiment into strips and more particularly to such a grinder particularly suitable for slicing pieces of softer foodstuffs such as chocolate.

2. Description of the Related Art

Grinders which slice condiment such as chocolate or nutmeg into strips have been developed in the prior art. Such devices are described in U.S. Pat. No. 3,552,460 issued Jan. 5, 1971 to Cooney and U.S. Pat. No. 4,311,283 issued Jan. 19, 1982 to Bounds, the inventor of the present application.

The Bounds patent describes a nutmeg grater in which the nutmeg is held in place to a spring loaded rotator by means of spikes. The nutmeg is rotated against a fixed cutting blade. The retention of the condiment in the drive mechanism by means of spikes which drive into the nutmeg obviates the use of this device with a softer material such as chocolate which cannot be held to the drive in this manner. Further, this device will not operate to grind a number of small pieces of condiment rather than a single larger piece.

The Cooney patent describes a device in which the material to be ground is in the form of a block which is contained within a barrel. The barrel is shaped to restrain rotation of the block of condiment relative to the barrel. The barrel is spring urged against fixed cutting blades and the barrel rotated to effect the grinding or slicing operation. This device while operable with softer material such as chocolate requires that the condiment be in the form of a block which fits within the barrel. It is not adapted to handle several smaller pieces of condiment.

SUMMARY OF THE INVENTION

The device of the present invention is a grinder which can readily be disassembled for replacement or cleaning of its parts. A main container has a top portion rotatable relative to the container having a drive handle which is removably coupled to drive arms. The drive arms are removably mounted in the bottom portion of the container in a compartment formed between first and second flat plates. The first plate, which is slidably supported, is urged towards the second plate by means of a spring. The second plate which is removably mounted at the base of the container has cutting blades formed therein. The second plate is restrained against rotation relative to the container.

The condiment to be ground which may in the form of a single piece or multiple pieces is placed in the compartment in which the drive arms are contained. When the drive handle is manually rotated, the drive arms drive the condiment against the cutting blades to effect the grinding action. The cutting blades are elongated and are shaped to permit the ground condiment to pass out of the compartment and container. The various parts of the device including the cutting blade plate, the drive arms, the top portion, the top plate and the spring can readily be removed for repair or replacement.

It is therefore an object of this invention to provide an improved slicing grinder which can be used to grind either softer or harder condiment in either a single piece or several pieces;

It is a further object of this invention to provide a slicing grinder in which the components can readily be removed for replacement or repair;

Other objects of the invention will become apparent in view of the following description taken in connection with the accompanying drawings.

DESCRIPTION OF THE DRAWINGS

FIG. 1 is a side perspective view of a preferred embodiment of the invention;

FIG. 2 is a cross sectional view of the preferred embodiment taken along the plane indicated by 2—2 in FIG. 1.

DETAILED DESCRIPTION OF THE INVENTION

Figure 3:
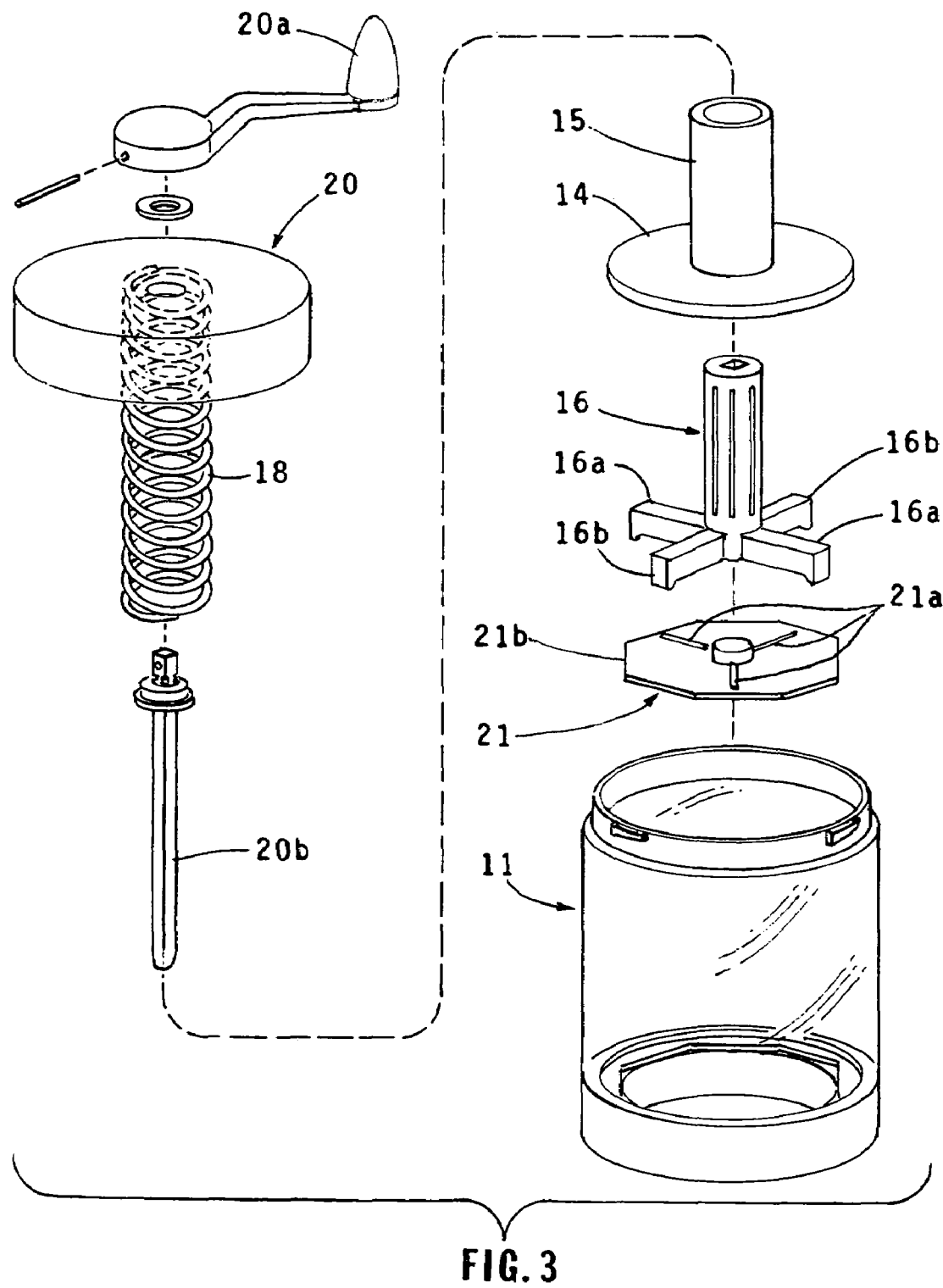
FIG. 3 is an exploded view of the preferred embodiment.

Referring to the Figures, cylindrical container 11 has a top portion 20 which is rotatably supported on the top of the container. The top portion has a drive shaft 20b which extends therefrom and a drive handle 20a for use in manually rotating the top portion. Drive shaft 20b is removably coupled to drive arm assembly 16 in a manner such that the drive arm assembly will be rotated when the drive shaft is rotated. Drive arm assembly has two pairs of arms 16a and 16b extending outwardly from its center. The pair of arms 16a is positioned at approximately right angles to the pair of arms 16b.

Upper flat plate 14 has a cylindrical sleeve 15 which is fitted through an aperture in the plate and is fixedly attached thereto. Drive shaft 20b fits through sleeve 15 and, as noted above, engages drive arm assembly 16 in a manner such that it is not rotatable relative thereto. Bottom flat plate 21 has elongated cutting blades 21a formed therein and is removably mounted in the bottom of the container but fixed in position against rotation by virtue of its linear edges 21b which abut against the walls of the container. The cutting blades are angled inwardly so that the sliced material will fall out of the container. Coil spring 18 is installed between the inner surface of top portion 20 and the top surface of upper plate 14, thereby urging the plate towards bottom plate 21. A compartment 23 is formed between plates 14 and 21 in which the condiment 24 to be ground is placed.

The device is operated as follows: Condiment to be ground is placed in the compartment formed between plates 14 and 21. When handle 20a is rotated, arms 16a and 16b drive the condiment 24. which may for example, constitute pieces of chocolate or nutmeg against the blades 21a to slice the particles into particles and drive such particles out of the container.

It is to be noted that for different applications, the blades can be changed, as may be appropriate. Also, the device can be readily disassembled and reassembled to either repair, clean or replace any of the separable units.

While the invention has been described and illustrated in detail, this is intended by illustration and example only and is not intended by way of illustration, the spirit and scope of the invention being limited by the terms of the following claims:

I claim:

1. A grinder for grinding condiment comprising:

a container having a longitudinal axis:

a first plate slidably mounted within said container;

a second plate mounted within said container at the bottom end thereof and spaced from said first plate, said second plate having at least one cutting blade formed therein and extending there through, said second plate being restrained against rotation about the longitudinal axis of said container;

at least one drive arm running substantially normal to the longitudinal axis of said container, said drive arm being rotatably mounted in said container between said first and second plates;

spring means for resiliently urging said first plate towards said second plate; and means for rotatably driving said drive arm; and a compartment formed between said first and second plates, the condiment being contained in said compartment, said drive arm driving said condiment against said blade to effect slicing thereof.

2. The grinder of claim 1 wherein said second plate has a plurality of cutting blades formed therein and extending there through.

3. The grinder of claim 1 wherein said first and second plates are both substantially flat and substantially parallel to each other.

4. The grinder of claim 1 wherein there are two pairs of said drive arms, one pair of said arms extending normal to the other pair.

5. The grinder of claim 1 wherein said means for rotatably driving said drive arm arms comprises a top drive portion rotatably mounted on the top of said container, and a drive shaft coupling said top drive portion to said drive arm.

6. The grinder of claim 5 wherein said top drive portion has a drive handle for use in manually rotating the top drive portion.

7. The grinder of claim 1 wherein said first and second plates and said top drive portion are removably mounted in said container.

8. The grinder of claim 1 wherein said cutting blade is substantially linear in shape.

9. The grinder of claim 1 wherein said spring means comprises a coil spring mounted in said container between said top drive portion and said first plate.

10. A grinder for grinding condiment comprising;

a first plate slidably mounted within said container;

a top drive portion rotatably mounted at the top end of aid container for rotation about the longitudinal axis of said container;

a drive shaft connected to said top drive portion;

a second flat plate slidably mounted at the bottom end of said container and spaced from said first flat plate, said second flat plate having at least one cutting blade formed therein, said cutting blade extending through said second plate;

a first and second pair of drive arms running substantially normal to the longitudinal axis of said container, said first pair of drive arms running substantially normal to said second pair of drive arms, said drive shaft being removably connected to said drive arms;

a coil spring mounted in said container between said top drive portion and said first flat plate, said spring resiliently urging said first plate towards said second plate; and a compartment being formed between said first and second plate in which the condiment is containe whereby when said top drive portion is manually rotated, said drive arms drive the condiment against said cutting blade blades to effect slicing of said condiment, the sliced condiment passing through said second plate out of the bottom of said container.

11. The grinder of claim 10 wherein said top drive portion includes a handle for use in the manual rotation of said top drive portion.

12. The grinder of claim 10 wherein there are a plurality of cutting blades formed in said second plate.

* * * * *